(12) United States Patent
Lassota et al.

(10) Patent No.: US 9,428,286 B1
(45) Date of Patent: Aug. 30, 2016

(54) METHOD OF MAKING A HOUSING FOR FOOD-RELATED APPARATUS WITH ARCUATE PANELS

(71) Applicant: Food Equipment Technologies Company, Inc., Lake Zurich, IL (US)

(72) Inventors: Zbigniew G. Lassota, Long Grove, IL (US); Bartosz Sokolski, Elmwood Part, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 0 days.

(21) Appl. No.: 13/920,518

(22) Filed: Jun. 18, 2013

Related U.S. Application Data

(62) Division of application No. 10/884,149, filed on Jul. 2, 2004, now Pat. No. 8,516,947.

(51) Int. Cl.
*B23P 11/00* (2006.01)
*B65D 8/04* (2006.01)
*B21D 11/10* (2006.01)
*B21D 51/02* (2006.01)
*B65B 1/00* (2006.01)

(52) U.S. Cl.
CPC .................................... *B65B 1/00* (2013.01)

(58) Field of Classification Search
CPC ...... B21D 51/04; B21D 51/06; B21D 51/12; B21D 51/18; B21D 51/2646; B21D 51/2676; B21D 11/206; B21D 11/203; B21D 11/20; B21D 5/16; B21D 5/00; B21K 21/04; A47J 31/00; A47J 31/4403; A47J 42/00
USPC ........ 29/446, 525.01, 455.1, 469.5; 220/669, 220/62.1, 670–671; 72/379.4
See application file for complete search history.

(56) References Cited

U.S. PATENT DOCUMENTS 5,755,376 A * 5/1998 Greer et al. .................. 229/107
7,740,149 B2 * 6/2010 Luburic ........................ 220/671

* cited by examiner

*Primary Examiner* — Alexander P Taousakis
*Assistant Examiner* — Matthew P Travers
(74) *Attorney, Agent, or Firm* — James W. Potthast; Potthast & Associates

(57) ABSTRACT

Method of making a housing having wall panels (58, 60, 62 and 64) formed from a single, metallic work piece (50) by folding it at each of four locations defining corners all of which are spaced from opposite ends of the work piece (50) with at least one fold having an angle substantially different from a right angle and then securing together opposite ends (52, 54) of the work piece with a weld joint (56). As a result of bringing together the opposite ends, at least one of the panels curved in a stressed state and forms interior corner angles at opposite sides that are substantially different from a right angle. A closure base (48) is attached to the bottom of the wall assembly (44) to close and support the open bottom of the wall assembly (44), and as closure top (46) is attached an open top of the wall assembly (44).

22 Claims, 6 Drawing Sheets

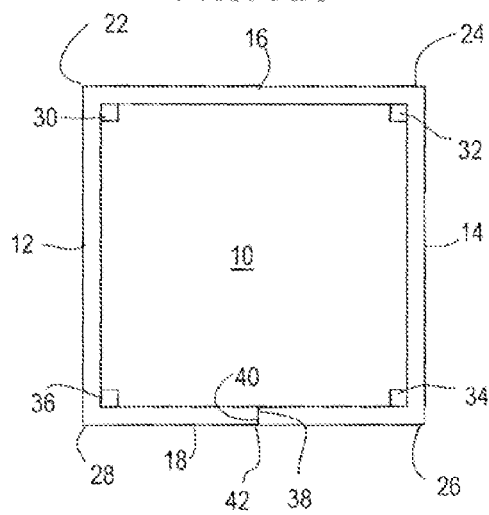
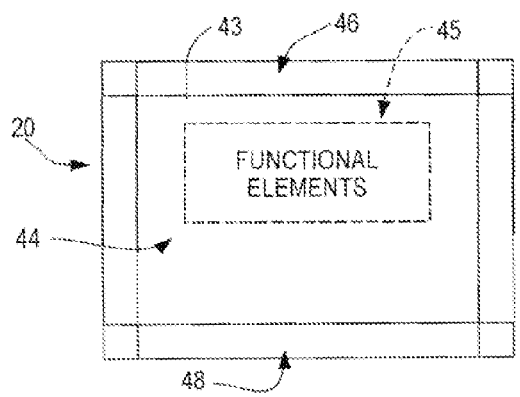
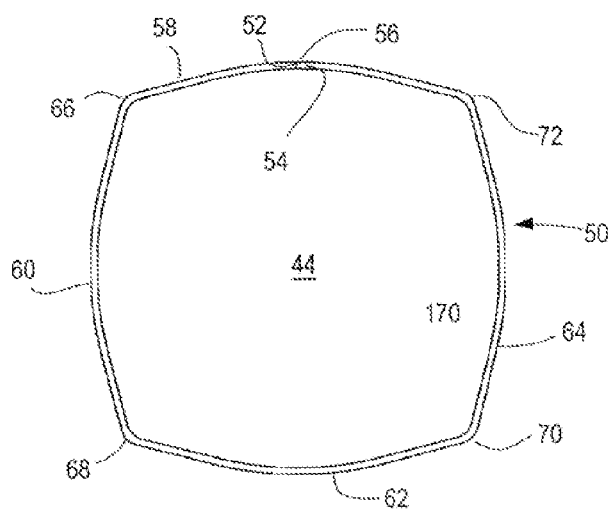

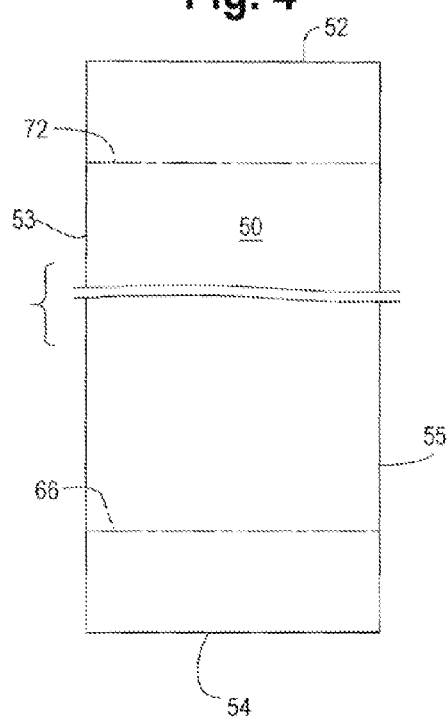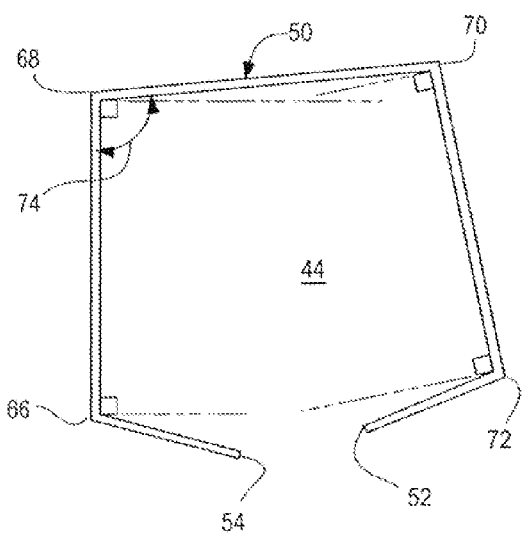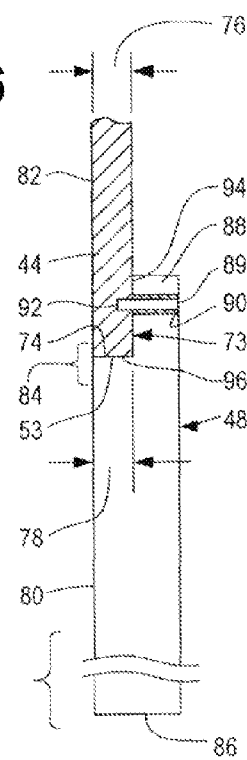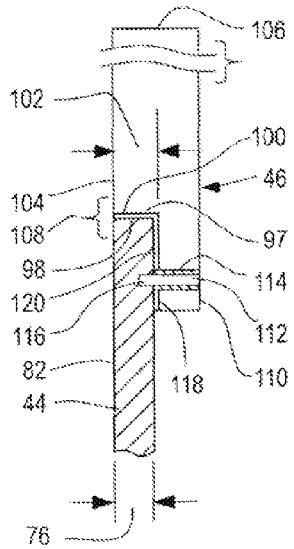

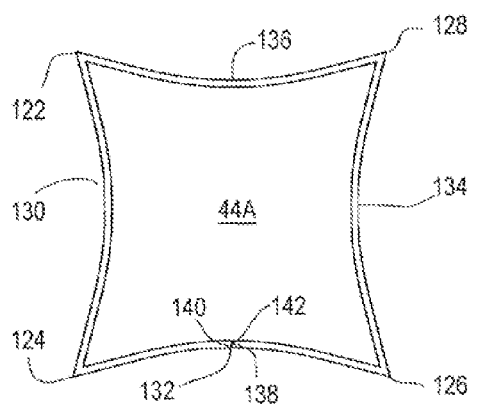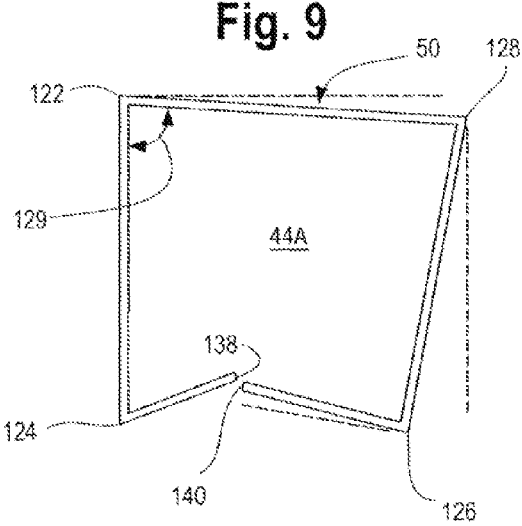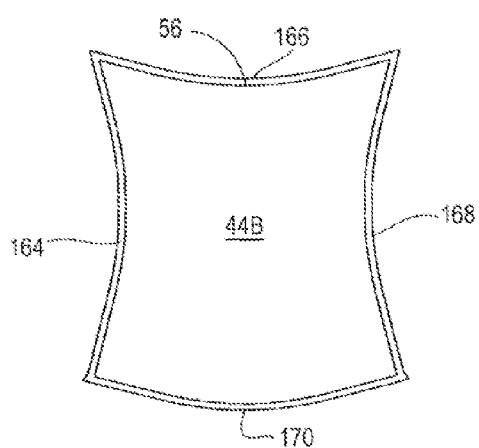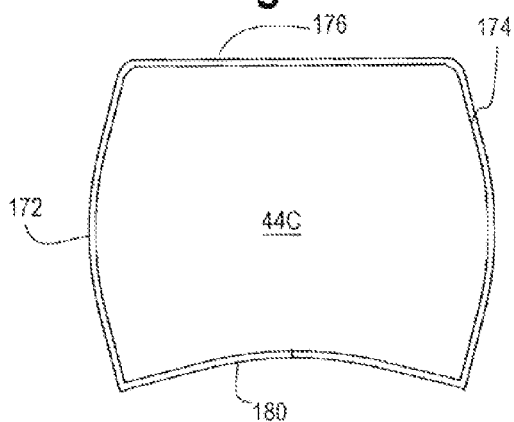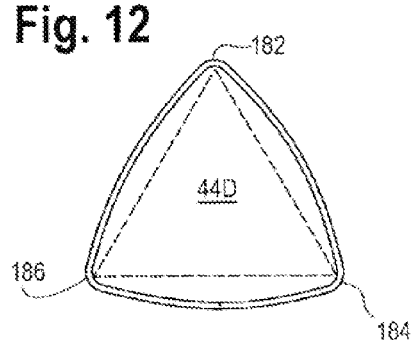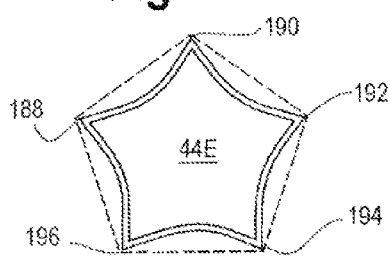

METHOD OF MAKING A HOUSING FOR FOOD-RELATED APPARATUS WITH ARCUATE PANELS

CROSS-REFERENCE TO RELATED APPLICATIONS

This application is a divisional of and claims the benefits under 35 U.S.C. 120 of U.S. application Ser. No. 10/884,149, filed Jul. 2, 2004, which, in turn, is a continuation-in-part of and claims the benefit under 35 USC 120 of the following applications of the co-inventors of the present invention: U.S. Ser. Nos. 29/180,329; 29/180,316; 29/180,336 and 29/180,317, all filed on Apr. 22, 2003, and all hereby incorporated by reference.

BACKGROUND OF THE INVENTION

1. Field of the Invention

This invention relates generally to food equipment, such as commercial coffee brewers, tea brewers, iced tea brewers, hot water dispensers, coffee bean grinders or other food grinders, insulated beverage dispensers, and other food related apparatus used to either prepare or dispense food or beverages or ingredients, and more particularly to such food-related apparatus with protective housings and methods of making such housings.

2. Discussion of the Prior Art

All known food-related housings of the type having four planer walls are generally made from thin-walled, stainless steel, or the like. Such stainless steel is required for purposes of hygiene, durability and maintenance of an attractive and clean outward appearance. It is also known to form housings made from molded plastic but such plastic housings are not suitable for commercial applications for reasons noted above. These four planer panels are sometimes formed from a single rectangular work-piece that is provided with three right angle, or 90-degree, bends or corners. After the right angle bends are formed, the distal ends are pulled together and permanently welded to form a fourth right angle bend in the housing where the two ends meet. Alternatively, four folds are provided, and a weld joint is made in the middle of one of the four walls. The finished housing, wall assembly has a rectangular cross-section with two pairs of opposite walls that are parallel to each other. Each wall of each pair of parallel walls is perpendicular to the two walls of the other pair of parallel walls. Both of the opposite ends of the rectilinear housing wall assembly are open and must be closed by other elements of the housing. Two non-parallel walls are joined when the distal ends of the work piece are secured together.

Generally, a bottom one of the open ends is fitted onto a rectilinear base sub-assembly that may be made of plastic or the like. Likewise, the other open end is fitted with a top cover sub-assembly that may also be made of plastic and includes an access opening and a movably mounted closure for selectively closing the access opening. The base sub-assembly has a rectangular shaped, outer, perimeter ledge surrounding an inner, upwardly standing, rectangular shaped, bottom lateral support member that is received within the open bottom of the rectilinear housing wall assembly. The rectilinear housing wall assembly is fitted over the inner lateral support member with the inner surface of the walls adjacent the bottom pressed against the lateral support member. The bottom edge of the rectilinear housing wall assembly rests upon the outer, perimeter ledge. The width of the outer perimeter ledge is substantially equal to the width of the thin walls of the rectilinear housing wall assembly and the outer surface of the walls forms a generally smooth continuous surface with the outer surface of the base beneath the ledge.

Likewise, the top cover sub-assembly has a rectangular shaped, outer, perimeter, downwardly facing shoulder surrounding an inner, downwardly extending, rectangular shaped, top lateral support member that is received within the open top of the rectilinear housing wall assembly. The rectilinear housing wall assembly is fitted around the inner lateral support member with the inner surface of the walls adjacent the top pressed against the top lateral support member. The downwardly facing shoulder rests upon the top edge of the rectilinear housing wall assembly that thereby supports the top cover sub-assembly. The width of the outer perimeter shoulder is substantially equal to the width of the thin walls of the rectilinear housing wall assembly and the outer surface of the walls forms a generally smooth continuous surface with the outer surface of the top cover above the shoulder.

While suitable rectilinear steel housings are made by this technique, there some disadvantages in the manufacturing process. Because the walls have a planer thin-wall construction with a thickness in a range from 16-gage to 24-gage, for instance, the finished housing wall assembly is easily distorted to a generally non-rectangular shape, and the individual walls are easily distorted to a non-planer configuration before being mounted to the base sub-assembly and to the top cover sub-assembly, as described above. This distortion makes assembly of the wall sub-assemblies very difficult. Specifically, distortion makes it difficult to connect the top and bottom of the finished housing wall assembly with rectangular shaped and rigid mounting grooves in a top closure a base with which the top and bottom of the wall sub-assembly must be mated and attached.

Generally, the rigidity may be improved by increasing the thickness of the work piece of the wall assembly, but this adds to the cost of materials and also to the weight of the finished housing assembly and the food equipment employing the heavier housing. Accordingly, there is a need to provide a manufacturing process that enhances the lateral rigidity of wall assemblies made from thin-walled, flexible work pieces to facilitate assembly with non-flexible, rigid base supports and top closures of the finished housing assembly that overcomes the assembly problems noted above.

SUMMARY OF THE INVENTION

It is therefore the object of the present invention to provide a method of making a housing for food equipment or other food related apparatus, such as a coffee brewer or the like, with a housing made from a thin-walled, flexible work piece that overcomes or reduces the manufacturing problems or disadvantages noted above with respect to food equipment with rectangular, flexible housings made of steel or the like.

This objective is achieved in part by provision of a method of making a housing assembly for a food-related apparatus by performance of the steps of pre-forming a base closure with an upwardly facing and a surrounding support ledge having at least one curved section, forming a wall assembly from a planer, thin-walled, flexible, resilient work piece having a top, a bottom with a bottom edge and a pair of generally parallel, linear, opposite ends extending between the top and the bottom, by performance of the steps of bending into the work piece a plurality of substantially straight folds that are generally parallel to the pair of opposite ends including at least one fold having an interior angle that is significantly greater than or lesser than a right angle, after the plurality of substantially, straight folds are made, bringing the opposite ends together in mating, abutting relationship to place the work piece in a stressed state with a cross-sectional configuration congruent with the surrounding support ledge, attaching the opposite ends together in abutting, mating relationship to maintain the work piece in a stressed state, and fitting the entire bottom edge on top of and in supported relationship with respect to the surrounding ledge.

In one embodiment, the opposite side wall panels are resiliently flexed inwardly into a concave configuration when the opposite sides of the work piece are brought together in mating relationship and remain in a stressed condition after the opposite sides are attached together.

In another embodiment, the opposite side wall panels are resiliently flexed outwardly in a convex configuration when the opposite ends of the work piece are brought together in mating relationship and remain in a stressed condition after the opposite sides are attached together.

Housings with wall assemblies having all different combinations of convex, concave and planer wall panels are contemplated.

The objective is also acquired, in part, by providing a method of forming a housing assembly for protectively enclosing functional elements of a food related apparatus, by performing the steps of providing a thin-walled, integrally formed, tubular wall assembly with an open top, and an open bottom, and having extending between the top and the bottom a plurality of panels, at least one of said panels being a curved panel made from a resilient flexible material and held in a stressed state, mounting one end of the wall assembly to a base closure for supporting the wall assembly in an upright position and to close the open bottom, and attaching a top closure attached to another end of the wall assembly opposite the one end to at least partly close the open top.

BRIEF DESCRIPTION ION OF THE DRAWINGS

The foregoing objects, advantages and features of the food equipment apparatus of the present invention and method of making same will be described in greater details and other advantageous features will be made apparent from a detailed description of an embodiment of the invention provided below with reference to the several figures of the drawing, in which:

FIG. 1 is a plan view of a PRIOR ART rectilinear housing wall assembly in the shape of a rectangle;

FIG. 2 is a front elevation, schematic view of food equipment apparatus of the present invention having a thin-walled steel housing, wall sub-assembly mounted with a plastic base sub-assembly and a plastic top cover sub-assembly;

FIG. 3 is a plan view of one embodiment of the non-rectilinear housing wall sub-assembly of FIG. 1 in which all of the walls are convex;

FIG. 4 is a plan view illustration of the bends made in a rectangular work-piece to form the completed wall assembly of FIG. 6 with all concave walls;

FIG. 5 is a plan view illustration of the bends made in as rectangular work-piece to form the completed wall assembly of FIG. 3 in which all of the walls are convex:

FIG. 6 is an enlarged cross section of the juncture of the end of a housing wall assembly and the base sub-assembly, or base, of FIG. 2;

FIG. 7 is an enlarged cross section of the juncture of the top end of a housing wall assembly with the top cover assembly, of FIG. 2;

FIG. 8 is a plan view of another embodiment of the non-rectilinear housing wall assembly in which all of the walls are concave;

FIG. 9 is a plan view illustration of the bends made in the rectangular work-piece of FIG. 4 to form the cornered concave wall assembly of FIG. 8.

FIG. 10 is a plan view of another embodiment of the non-rectilinear housing wall assembly in which three of the walls are concave and one is convex;

FIG. 11 is a plan view of another embodiment of the non-rectilinear housing wall assembly of FIG. 1 in which two of the walls are convex, one wall is concave and one is planer;

FIG. 12 is a plan view of another embodiment of the cornered arcuate housing assembly of FIG. 2 in which there are only three corners and three arcuate walls;

FIG. 13 is a plan view of another embodiment of the cornered arcuate housing assembly in which there are five corners and five arcuate walls;

DETAILED DESCRIPTION

Figure 14:
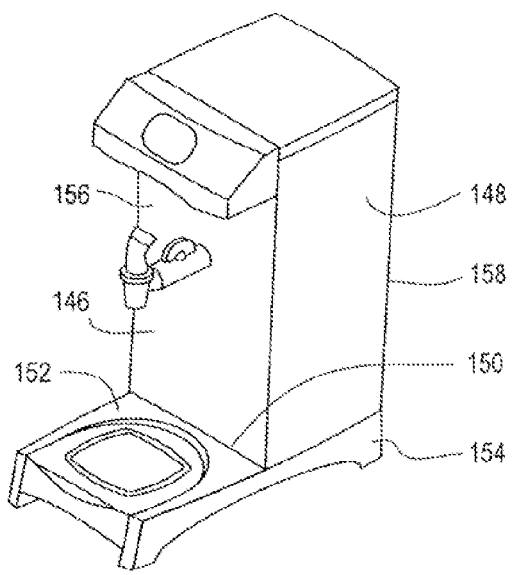
FIG. 14 is a perspective view of a hot water boiler, or hot water dispenser, that employs the present invention.

A food equipment housing constructed in accordance with the present invention has a non-rectilinear shape formed from a non-rectilinear housing wall assembly in combination with congruent, non-rectilinear base sub assembly and a congruent, non-rectilinear cover sub-assembly. The non-rectilinear housing assembly, instead of having all planer walls, has at least one, and preferably four, arched walls that give the housing assembly increased later strength and resistance against distortion. Because of the increased strength, lighter gage steel may be used to achieve the same degree of rigidity as obtained with a rectilinear housing wall assembly to reduce cost and weight of the housing wall assembly. Preferably, at least the sidewalls are curved outwardly, i.e. are convex walls. In such case, the convex, arch-like, outward curvature is obtained by creating folds in a planer, rectangular work piece to form four corners with internal angles that are slightly larger than 90-degrees, such as 95 to 120-degrees. When the opposed ends of the work piece are welded to each other in aligned abutment, the resultant configuration is a tubular shape with four bent corners greater than 90-degrees. Preferably, the front and back wall panels are kept planer while the sidewall panels are caused to curve outwardly.

The exact location and angles that are to be used for a particular configuration are generally determined experimentally with a sample work piece, but greater the angle of the bend at the corners at the opposite ends of a wall exceeds of is less than ninety degrees, the greater the amount of curvature of the wall.

In an alternative embodiment, all four walls are curved inwardly, i.e. are concave walls. In such case, the concave, arch-like, outward curvature is obtained by creating four folds in a planer, rectangular work piece to form four corners with internal angles that are slightly less than 90-degrees, such as 85-degrees to 75-degrees. When the opposed ends of the work piece are welded to each other in aligned abutment, the resultant configuration is a tubular shape with four bent comets less than 90-degrees and four inwardly curved concave walls that extend between the four bent corners. The smaller the angle of the bend at the corners at opposite ends of a wall, the greater the amount of concavity of the wall.

The amount of curvature may be different for different walls but preferably the curvatures of opposite walls are the same to provide center-line symmetry to the food equipment and the housing.

In other embodiments, one or one pair of walls is convex while the other walls are concave, or vice versa, or one wall or one pair of opposite walls is planer while the other walls are convex, concave or both, and vice versa.

In accordance with the preferred embodiment, the base and the top cover are both provided with a peripheral ledge, or shoulder, that has a shape or configuration conformed to that of the open end of the non-rectilinear housing wall assembly. Because of the improved rigidity of the non-rectilinear housing assembly of the present invention, it better keeps its shape in conformity with the fixed shape of the peripheral ledge or shoulder and this facilitates easy connection and assembly of the wall assembly with the base and the top cover assembly.

Before describing the embodiments of the present invention, reference should first be made to the drawing of FIG. 1 that depicts a plan view of the rectilinear housing wall assembly 10 of the prior art. The housing wall assembly 10 is characterized by four planer walls 12, 14, 16 and 18 that are joined together at four corners 22, 24, 26 and 28. The planer walls form 90-degree right angles 30, 32, 34 and 36. The housing wall assembly is made from an integral: planer, rectangular, steel work-piece that is pre-bent at the 90-degree angles. The opposed ends of the work-piece 38 and 40 are then brought together in abutting alignment and then fixedly secured together by means of a weld joint 42. Alternatively, the weld joint forms one of the four right-angle corners. Because the planar walls 12-18 are relatively flexible in a transverse direction the rectangular configuration may distort to a non-rectangular parallelogram or otherwise and thereby making mounting of the housing wall assembly to the fixed, rigid rectangular base a difficulty.

Referring now to FIGS. 2 and 3, the preferred embodiment of the food ingredient apparatus 20 of the present invention with a curved wall non-rectilinear housing 43 is seen to include a non-rectilinear, curved, housing wall assembly 44 extending between a base assembly, or base, 46 and a top cover assembly, or cover, 48. Functional elements 45 are protectively contained within the housing assembly 43. The housing wall assembly 44 has four corners defined by bends in a single rectangular, thin walled planer work piece 50 with opposite ends 52 and 54. The work piece is flexed to a position in which the opposite ends 52 and 54 are in aligned abutting relationship and then fixedly secured together by a suitable weld joint 56. There are four, convex, outwardly curved, arcuate, thin, walls 58, 60, 62 and 64 defined by bends at corners 66, 68, 70 and 72. Convex wall 58 is defined by the two distal wall sections extending between the corner 66 and the distal end 54 and between the corner 72 and the end 52, respectively, that are joined together by the weld joint 56. The interior angles formed by the juncture of the pairs of walls at the corners 66, 68, 70 and 72 are obtuse, being larger than ninety-degrees, and are preferably in the range of 95-degrees to 110-degrees. All of the angles of the four corners are the same and the length of each of the walls 60, 62, 64 and 66 are the same and the straight distance between all adjacent corners are equal to each other, with the four corners being located at the four corners of an imaginary rectilinear square. The walls are preferably made of thin walled stainless steel preferably having a thickness in the range of 18-gage to 24-gage. The height of the walls are all equal, being integrally formed from a work piece that is rectangular, and have a dimension of approximately six-inches to three feet depending upon the size and type of food equipment for which the housing wall assembly is designed, such as an insulated dispenser, brewer, grinder, etc, of varying size and capacities.

During manufacture of the housing, wall assembly 44, an elongate work piece shown in FIG. 4 is pre-bent along bend lines that coincide with the desired location of the corners 66, 68, 70 and 72, such as indicated by broken-line representations of the bend lines for bends 66 and 72. The bends are parallel to the opposite ends 52 and 54 and are perpendicular to a bottom edge 53 and a top edge 55, which, in turn, are parallel to each other. As seen in FIG. 5, the internal angles 74 formed at these bend lines are equal and are all obtuse angles, being significantly larger than 90-degrees. Consequently, when the two opposite ends are brought together as shown in FIG. 3, the walls 58, 60, 62 and 64, all spontaneously bow outwardly as shown. The amount by which the wall bow outwardly from what would otherwise be a rectangular configuration in a conventional housing wall assembly is directly proportional to the extent of obtuseness of the angle 74. The greater amount the angle 74 exceeds 90-degrees, the greater the amount of bowing.

Advantageously; in the arcuate housing wall assembly 44 of the present invention; bowing of the walls strengthens the walls individually and the cross section of the entire assembly 44 against distortion. In a conventional, rectilinear, housing assembly 10, when the four 90-degree bends are made, the abutting edges 40 and 42 naturally come together to form a rectangle and do not have to be forcibly held together against any resilient force that would be imparted by the work piece 50 due the edges 40 and 42 not being in abutment after the four right angle folds or bends are made. Because they are planer or flat and there is no spring tension or stress in the walls 12, 14, 16 and 18, the planer walls are relatively flexible, and the cross section of the entire planer housing wall assembly 10 is subject to distortion to the shape of a nonrectangular parallelogram.

On the other hand, in the arcuate housing assembly 44 of the present invention, after the four obtuse bends are made at the corners 68, 70, 72 and 74, the opposite ends are not naturally in an abutting relationship, but instead are space from each other by a significant distance. The greater the internal angle 74, the greater will be the distance separating the opposite ends of the work piece 50. Regardless of the dimension of the separation distance, because there is a significant separation distance, the opposite ends 54 and 56 must be forced together against the spring tension of the steel work piece tending to return the work piece to a non-stressed configuration shown in FIG. 5 in which the opposite ends are spaced from each other. With the ends being forced into abutting relationship, the entire housing wall assembly 44 is put under stress, and the walls are forced to bow outwardly as shown in FIG. 3. After the ends 52 and 54 are secured together by the weld joint 56, the walls 58, 60, 62 and 64 remain under stress and significantly more strongly resist either inward or outward movement and any distortion of the cross section of the entire housing wall assembly 44 than do the walls of the prior art housing wall assembly 10.

In the food equipment apparatus 20, the base 48 of the housing assembly is formed of molded plastic and has a mounting ledge 73 with a shape that is intended to precisely conform to the finished cross sectional shape shown in FIG. 3. In the embodiment shown in FIG. 6, the base 48 is seen to include the peripheral ledge 73 with an upwardly facing support surface 74 upon which the bottom edge 53 of the wall assembly 44 is supported. If the thickness 76 of the walls 58, 56, 58 and 60 of the arcuate wall assembly 44 is substantially equal to the thickness, or width, 78 of the of the upwardly facing support surface of the peripheral ledge 73 a continuous wall is formed. In such case, the outer surface 78 of the base 48, adjacent the bottom of the wall assembly 44, mates evenly and uniformly with the outside surface 82 of the wall assembly 44 to form a smooth, composite continuous surface 84 at the juncture of the bottom of the wall assembly 53 and the support surface 74. This smooth, composite, continuous surface 82 has the same cross sectional shape and dimension as outside surface 82 of wall assembly 44 and extends from the wall assembly 44 to the bottom 86 of the base 48 around the entire periphery to form the smooth composite surface 82 around the entire periphery of both the wall assembly 44 and the base 48.

The ledge 73 is defined, in part by an upstanding, annular collar, or neck, 88 that extends upwardly from the underlying support surface 74 by a sufficient distance to enable support of a radial fastener 89. The radial fastener 89 may be a screw, bolt, pin or other fastener that suitably secures the wall assembly 44 against vertical separation from the base 48 by passing through aligned pairs of holes 90 and 92 in the neck 88 and in the bottom of the wall assembly 44 adjacent the neck 88, respectively. Alternatively, detent fasteners or adhesive or other bonding is used to secure the wall assembly 44 to the base 48. The closed neck 88 is also snugly received within the bottom of the wall assembly 44 with the inside surface 94 of the wall assembly pressed against the outside surface 96 of the neck for an improved frictional inter-engagement.

Advantageously, although having arcuate walls 58, 60, 62, and 64, because the cross-sectional shape still has corners and thus a non-cylindrical, cross-sectional shape, once the neck 88 is snugly received within the bottom opening of the wall assembly 44, any pairs of aligned mounting holes 90 and 92 will be correctly located and aligned automatically and relative rotation is and resultant misalignment during assembly is inherently prevented.

Referring to FIG. 7, the top 46 is mounted to the top of the housing assembly 44 in a manner similar to the mounting of the base 48 to the housing assembly 44. In the food equipment apparatus 20, the top 46 is preferably formed of molded plastic and has a cross-sectional shape that is intended to precisely conform to the finished cross sectional shape shown in FIG. 3. Referring to FIG. 7, the top 46 is seen to include an inwardly extending peripheral shoulder 97 with a downwardly facing support surface 98 that rests upon and is supported by the top edge, or top, 100 of the wall assembly 44. If the thickness 76 of the walls 58, 56, 58 and 60 of the arcuate wall assembly 44 is substantially equal to the thickness, or width, 102 of the of the downwardly facing support surface 98 of the peripheral, shoulder, 97, a continuous wall is formed. In such case, the outer surface 104 of the top 46, adjacent the top 106 of the wall assembly 44, mates evenly and uniformly with the outside surface 82 of the wall assembly 44 to form a smooth, composite continuous outer surface 108 at the juncture of the top 100 of the wall assembly and the downwardly facing surface 98 of the shoulder 97. This smooth, composite continuous surface 108 has the same cross-sectional shape and dimension as that of the outside surface 82 of wall assembly 44 and extends from the top of the wall assembly 44 to the top 106 of the top 46 around the entire periphery to form the smooth composite surface 82 around the entire periphery of both the wall assembly 44 and the top 47.

The shoulder 97 is defined in part by an inwardly recessed, downwardly extending, closed collar, or neck, 110 that extends downwardly from the overlying surface 98 by a sufficient distance to enable support of a radial fastener 112. The radial fastener 112 may be a screw, bolt, pin or other fastener that suitably secures the wall assembly 44 against separation from the top 46 by passing through aligned pairs of holes 114 and 116 in the downwardly extending neck 110 and in the bottom of the wall assembly 44 adjacent the downwardly extending neck 110, respectively. Alternatively, detent fasteners or adhesive or other bonding is used to secure the wall assembly 44 to the top 48. The closed neck 110 is also snugly received within the top of the wall assembly 44 with the inside surface 118 of the wall assembly pressed against the inside surface 120 of the neck for an improved frictional inter-engagement.

Advantageously, although having arcuate walls 58, 60, 62, and 64, because the cross-sectional shape still has corners and a non-cylindrical, cross-sectional shape, once the neck 110 is snugly received within the top opening of the wall assembly 44, any pairs of aligned mounting holes 114 and 116 will be correctly located and aligned automatically. Unlike, cylindrical, housings, relative rotation and resultant misalignment during assembly is inherently prevented.

The improved rigidity of the cross-sectional shape of the wall assembly 44 facilitates assembly and enables tighter tolerances for the fit between the wall assembly 44 and the base 48 and top 46. In the known housings made in a rectangular shape, the relative flexibility of the planer wall sometimes results in cross-sectional distortion such that the wall planer wall assembly will not fit over the neck of the base or, if there is a fit, the fit is not a snug fit. Likewise, cylindrical housing assemblies may easily be distorted to a non-circular cross-section that will not fit properly as intended with a circular base, or if fitted, the associated pairs of mounting holes in the wall assembly and the base must be located and aligned and are not self-aligning, as in the arcuate cornered housing assembly 20 of the present invention. Because of the improved cross-sectional rigidity, relatively smaller gage metal may be used to form the housing wall assembly 44 than be required to achieve the same degree of rigidity in a housing assembly having a rectilinear configuration.

It should be appreciated that the improved cross-sectional rigidity of the housing wall assembly 44 is beneficial even when not used with a base like base 48 of FIG. 2 or a top like top 46 of FIG. 2, in which all sides of the wall assembly are aligned with walls of the housing and base sub-assemblies.

The concepts of the invention are also applicable in which one or more of the walls of the base sub-assembly or the base sub-assembly extend beyond the walls of the wall assembly. In such case, the section of the bottom or top of the housing wall assembly 44 that does not form a continuous surface with the base or cover is received within U-shaped groove formed in the top of a base or bottom of a top having periphery that extends beyond that of the housing wall assembly. For example, in the hot water boiler of FIGS. 14, 15 and 16 the bottom of the forward wall 146 of the wall assembly 148 is received in a slot 150 formed in a forwardly extending section 152 of the base 154. In this particular embodiment, the forward wall 156 and back wall 158 are relatively straight and parallel while the two opposite side walls 160 and 162 are bowed outwardly to enhance rigidity of the wall assembly 148.

Moreover, it should also be appreciated that while the wall assembly is preferably formed from a single rectangular piece of steel that is bent at the four corners and then bent into a stressed configuration to adjoin opposite ends that are then fastened to each other by a weld, the housing wall assembly could also be formed of individual planer walls that are secured together by welds, L-shaped joints and then bent into the desired configuration to achieve bowing. Alternatively, the individual walls may be preformed into arcuate shapes and then fastened together.

Referring now to FIGS. 8 and 9, an alternative embodiment 44A of the cornered arcuate housing for the food equipment apparatus 20 of FIG. 2 is seen to include four corners 122, 124, 126 and 128 that separate and define four walls 130, 132, 134 and 136. In this embodiment, instead of being convex or bowed outwardly, the walls are concave, or bowed inwardly. This configuration is preferably achieved in a manner very similar as the convex configuration of FIG. 3 is achieved. As seen in FIG. 9, the rectangular work piece 50 of FIG. 4 is bent at the four corners 122, 124, 126 and 128 to form inwardly acute angles 129 that are less than 90-degrees, preferably 85-degrees to 75-degrees. The greater the acuteness of the bend. i.e. the less the angle of the bend relative to 90-degrees, the greater will be the inward amount of bowing, when the opposite ends 138 and 140 are joined in aligned abutting relationship and welded together with a weld joint 142. Because of the acute bends, after the bends are made the ends tend to overlap and must be separated in order to join them in aligned abutting relationship. It is this strain that forces the walls to bow inwardly and enhances rigidity of the cross-section.

Other cross-sectional configurations are contemplated by the present invention. For instance, with appropriate bend angles at appropriate corners, as discussed above, three of the walls 164, 166 and 168 of a wall assembly 4413 may be concave while one wall 170 is convex, as shown in FIG. 10. Conversely, three of the walls may be convex while one of the walls is concave. As seen in FIG. 11, two opposite side walls 172 and 172 of a wall assembly 44 C may be convex, while the back wall 176 may be planer and the front wall 178 may be concave. A front concave wall advantageously facilitates docking of a dispensing urn or the like with a cylindrical shape. Referring to FIG. 12, the wall assembly 4413 may be made with only three corners 182, 184 and 186 with three intermediate walls that are either convex, by making the bend greater than 60-degrees, or concave, by making the bend less than 60-degrees. Referring to FIG. 13, the housing wall assembly 44E may have more than four corners, such as five corners 188, 190, 192, 194 and 196 with either convex walls or concave walls by appropriate selection of angles greater or lesser than 180-degrees divided by the number of corners.

Figure 15:
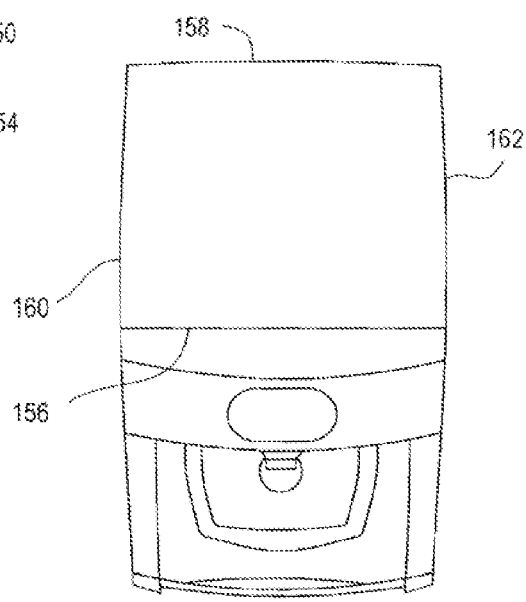
FIG. 15 is a plan view of the hot water boiler of FIG. 14 in which the base extends forwardly of the curved wall assembly and the support ledge is at the bottom of a slot formed in the forward portion of the base sub-assembly.
Figure 16:
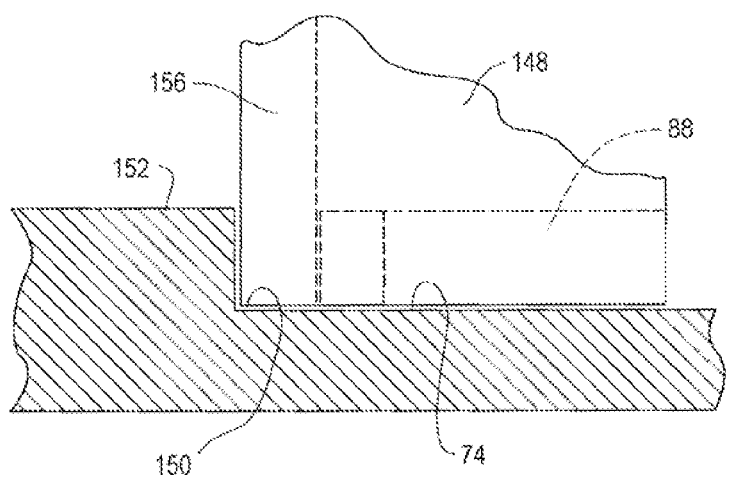
FIG. 16 is a cross-sectional view of a portion of the hot water boiler housing of FIGS. 14 and 15 illustrating the surface continuity of the bottom of the front wall panel mounting slot and the top surface of the support ledge.

As shown in FIGS. 14 and 15 and discussed above, the front and back walls 156 and 158 may be planer while the side walls 160 and 162 are convex. In such case, the obtuse angles are formed only in the side panels and not in the back panels. As in all configurations, the exact angles needed for a particular configuration are dependent upon the resiliency of the steel or other metal, the thickness and size of the work piece. In accordance with the method of the invention the actual number of degrees for the different folds and their location needed for a preselected cross-sectional configuration is determined by experiment. Such experiment can be based on the assumption that acute angles are needed for concave formation, obtuse angles are needed for the formation of convex panels and the larger the difference of the interior angle from ninety degrees, the larger will be the extent of curve that is formed in the panel.

Generally, the invention contemplates a method of making a housing assembly for a food processing apparatus by performing the steps of pre-forming a base closure with an upwardly facing and encircling support ledge having, at least one curved section and forming a wall assembly from a planer, thin-walled, flexible work piece having a top, a bottom and a pair of generally parallel, elongate opposite ends extending between the top and the bottom. The wall assembly is made by first bending into the work piece a plurality of substantially straight folds that are generally parallel to the pair of opposite ends including at least one fold having an interior angle that is significantly greater than or lesser than a right angle. Then, after the plurality of substantially, straight folds are made, the opposite ends are brought together in mating relationship to flex at least an edge at the bottom of the work piece into a configuration congruent with the encircling support ledge. Then, while held in abutting aligned relationship, the opposite ends are attached together in abutting, mating relationship substantially along the entire length of the elongate opposite ends. The bottom edge of the completed wall assembly is then fitted on top of, and in supported relationship with respect to, the encircling, ledge.

Preferably, the work piece is made of a thin-walled sheet of steel with a rectangular shape and the folds define corners that define wall panels of the wall assembly that extend between adjacent corners, in the case of a rectangular configuration there are four folds that define four corners located between a front wall panel, a back panel wall and a pair of opposite side wall panels. In one embodiment, the opposite side wall panels are resiliently flexed outwardly into a convex configuration when the opposite sides of the work piece are brought together in mating relationship and remain in a stressed condition after the opposite sides are attached together.

In another embodiment, opposite side wall panels are resiliently flexed, inwardly into a concave configuration when the opposite sides of the work piece are brought together in mating relationship and remain in a stressed condition after the opposite sides are attached together.

The formation of wall assemblies with all different combinations of convex, concave and planer wall panels are contemplated by the present invention as well as are wall assemblies with more or less than four wall panels.

In preferred embodiments, the step of includes the steps of bending into the work piece at least one pair if not two pairs of adjacent folds each having an interior angle less than ninety degrees or substantially greater than ninety degrees.

Figure 17:
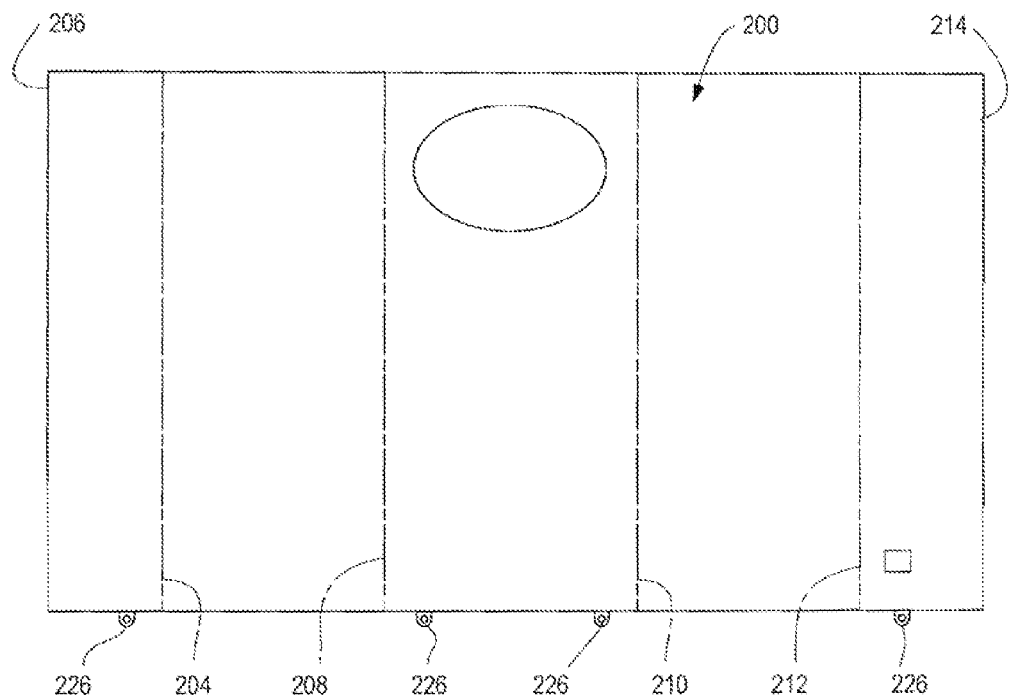
FIG. 17 is a plan view of a work piece of a preferred embodiment of the present invention.
Figure 18:
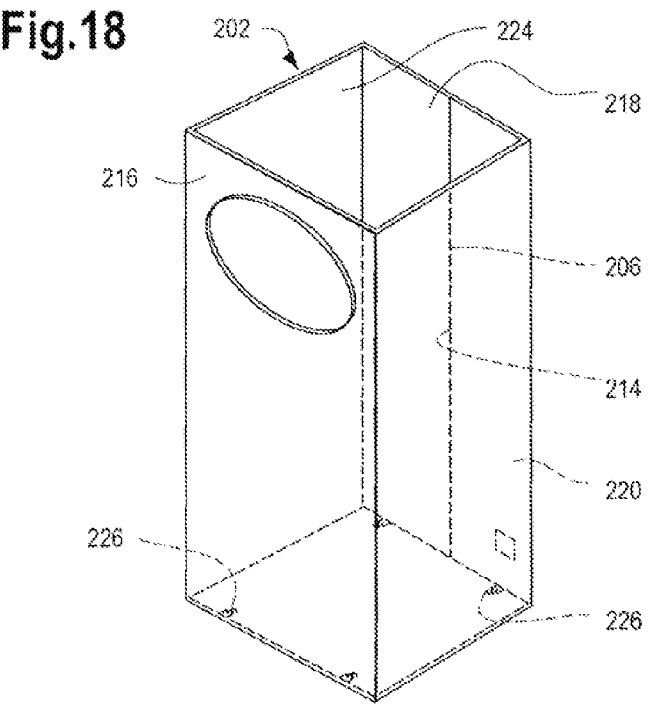
FIG. 18 is a perspective view of the work piece of FIG. 17 after it has been folded into a housing section with outwardly curved walls such as shown in FIG. 3.

Referring to FIG. 17 a rectangular work piece 200 is shown that is used to construct the housing section 202 of FIG. 18. The work piece 200 has a total length of 31.045 inches and a width of 17.748 inches. It is made of thin-walled 22-gauge 303-stainless steel or 304-stainless steel. A first fold line 204 is located 3.089 inches from the left edge 206 and is given a bend angle of 101-radial degrees. The second fold line 208 is located 11.297 inches from the left edge 206 and is given a bend angle of 95 radial degrees. The third fold line 210 is located 19.748-radial degrees from the left edge 206 and is given a bend angle of 95-radial degrees like that of fold line 208. The last fold line 212 is located 27.236 inches from the left edge 206 of the work piece 200 and is given a bend angle of 101-radial degrees like that of the first fold line 204.

When the folds are made and the left edge 206 is brought together in uniform abutting relationship with the right edge 214 and welded in place, the housing section 202 results with four outwardly curved walls: front wall 216, back wall 218, right wall 220 and left wall 224. The back wall 218 is formed by the two end sections of the work piece that are joined together at edges 206 and 214 and has a surface length that is approximately 8.451-inches and is equal in width to the front wall 216. Each of the side walls is approximately 7.488-inches. The curvature of the front and back wall 216 and 218 are equal, and the curvatures of the side walls 220 and 224 are equal to each other and slightly more curved than the front and back walls.

Figure 19:
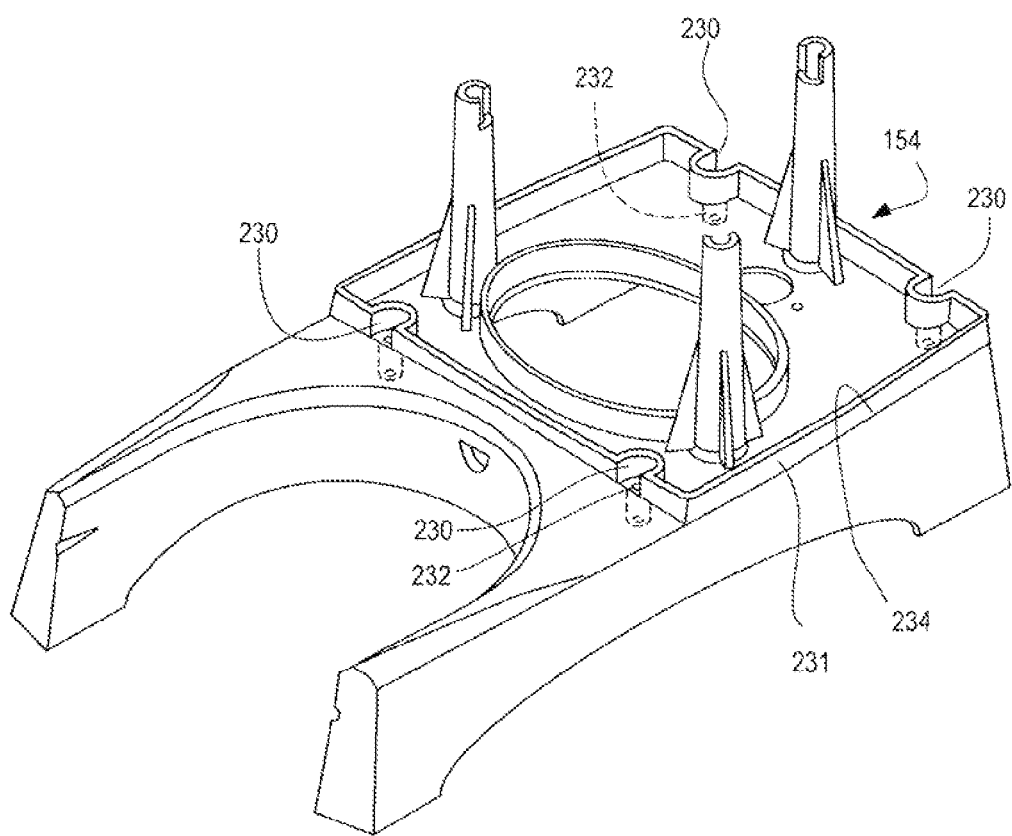
FIG. 19 is a perspective view of a preferred embodiment of a base upon which the housing section is mounted.

As seen in FIG. 18, the four mounting tabs 226 are folded inwardly. Referring to FIG. 19, the base 154 has four semi-cylindrical, vertical grooves 230 extending inwardly from a peripheral mounting wall 231 that slidably receives the four associated mounting tabs 226 when the housing section 202 is lowered down onto the base 154 during assembly. At the bottom of the grooves 230 are threaded bores 232 for receiving threaded fasteners (not shown) that pass through fastener holes in the tabs 226. The walls 216, 218, 220, and 224 adjacent the bottom edge of the housing section 202 surround and conform in shape to and abut the outer surface of the corresponding sides of the peripheral mounting wall 231. The bottom edge of the housing section 202 is supported on a ledge 234 surrounding mounting wall 231 and having a width that is equal to the thickness of the housing section wall the snug fit of the housing section wall around the mounting wall 231 hold the housing section 202 against lateral movement relative to the base 154 and the threaded fasteners hold the housing section 202 in this secure position. Because the ledge 234 is the same width as the thickness of the work piece, the housing section 202, after being mounted to the base 154 form a smooth continuous surface with the base side wall 236.

While a particular embodiment has been disclosed here, it should be appreciated that the food ingredient apparatus 20 and the housing assembly thereof may have different cornered arcuate or partly arcuate configurations without departing from the scope of apparatus and method of manufacture of the present invention.

The invention claimed is:

1. A method of making a housing assembly having a plurality of walls enclosing a space for a food-related apparatus, comprising the steps of:
    forming a base closure with an upwardly facing and a surrounding support ledge having a plurality of corners and at least one curved section extending between two of the of the plurality of corners that are adjacent to each
    forming, independently of the step of forming the base closure, a wall assembly from a planer, thin-walled, flexible, resilient work piece having a thickness, a top, a bottom with a bottom edge and a pair of generally parallel, linear, opposite ends extending between the top and the bottom, by performance of the steps of
    bending into the work piece a plurality of substantially straight folds that are generally parallel to the pair of opposite ends including at least one fold having an interior angle that is significantly greater than or lesser than a right angle,
    after the plurality of substantially, straight folds are made, bringing the opposite ends together in mating, abutting relationship to place the work piece in a stressed state with a cross-sectional configuration congruent with the surrounding support ledge including the curved section,
    attaching the opposite ends together in aligned, abutting, mating relationship to form one of the plurality of walls having the thickness of the work piece and to maintain the work piece in a stressed state; and
    fitting the entire bottom edge on top of the base closure and in supported relationship with respect to the surrounding support ledge.

2. The method of claim 1 in which the work piece is made of a thin-walled sheet of steel.

3. The method of claim 1 in which the work piece is generally rectangular.

4. The method of claim 1 in which the folds define corners at opposite sides of wall panels of the wall assembly which extend between adjacent corners and have the thickness of the work piece.

5. The method of claim 1 in which there are four folds that define four corners located between a front wall panel, a back wall panel and a pair of opposite side wall panels.

6. The method of claim 5 in which the opposite side wall panels are resiliently flexed outwardly into a convex configuration when the opposite sides of the work piece are brought together in mating relationship and remain in a stressed condition after the opposite sides are attached together.

7. The method of claim 6 in which the back wall panel is resiliently flexed outwardly into a convex configuration.

8. The method of claim 7 in which the front wall panel is resiliently flexed outwardly into a convex configuration.

9. The method of claim 7 in which the front wall panel is resiliently flexed inwardly into a concave configuration.

10. The method of claim 6 in which the front wall panel is resiliently flexed inwardly into a concave configuration.

11. The method of claim 6 in which the back wall panel is substantially planer.

12. The method of claim 11 in which the front wall panel is substantially planer.

13. The method of claim 6 in which the front wall panel is substantially planer.

14. The method of claim 5 in which the opposite side wall panels are resiliently flexed inwardly into a concave configuration when the opposite sides of the work piece are brought together in mating relationship and remain in a stressed condition after the opposite sides are attached together.

15. The method of claim 14 in which the back wall panel is substantially concave.

16. The method of claim 15 in which the front wall panel is substantially convex.

17. The method of claim 14 in which the front wall panel is substantially concave.

18. The method of claim 17 in which the back wall panel is substantially concave.

19. The method of claim 1 in which the step of bending includes the steps of bending into the work piece at least one pair of adjacent folds each having an interior angle greater than ninety degrees.

20. The method of claim 1 in which the step of bending includes the steps of bending into the work piece at least one pair of adjacent folds each having an interior angle less than ninety degrees.

21. The method of claim 1 in which the step of bending includes the steps of bending into the work piece at least two pairs of adjacent folds each having an interior angle substantially less than ninety degrees.

22. The method of claim 1 in which the step of bending includes the steps of bending into the work piece at least two pairs of adjacent folds, each having an interior angle substantially greater than ninety degrees.

\* \* \* \* \*